United States Patent
Levy

(10) Patent No.: US 11,505,887 B2
(45) Date of Patent: Nov. 22, 2022

(54) OZONE LAUNDRY SYSTEM

(71) Applicant: O3Waterworks LLC, Miami, FL (US)

(72) Inventor: Corey Levy, Boulder, CO (US)

(73) Assignee: O3WATERWORKS, LLC, Miami, FL (US)

( * ) Notice: Subject to any disclaimer, the term of this patent is extended or adjusted under 35 U.S.C. 154(b) by 0 days.

(21) Appl. No.: 17/441,812

(22) PCT Filed: Mar. 27, 2020

(86) PCT No.: PCT/US2020/025315
§ 371 (c)(1),
(2) Date: Sep. 22, 2021

(87) PCT Pub. No.: WO2020/198619
PCT Pub. Date: Oct. 1, 2020

(65) Prior Publication Data
US 2022/0090307 A1  Mar. 24, 2022

Related U.S. Application Data

(60) Provisional application No. 62/824,672, filed on Mar. 27, 2019.

(51) Int. Cl.
*D06F 35/00* (2006.01)
*D06F 33/37* (2020.01)
(Continued)

(52) U.S. Cl.
CPC ....... *D06F 35/001* (2013.01); *B01D 53/0438* (2013.01); *B01D 53/261* (2013.01);
(Continued)

(58) Field of Classification Search
None
See application file for complete search history.

(56) References Cited

U.S. PATENT DOCUMENTS

| 5,451,314 A | 9/1995 | Neuenschwander |
| 6,254,838 B1 | 7/2001 | Goede |

(Continued)

OTHER PUBLICATIONS

International Search Report and Written Opinion dated Sep. 28, 2020, for PCT Application Serial No. PCT/US2020/025315. (Related matter).

*Primary Examiner* — Richard C Gurtowski
(74) *Attorney, Agent, or Firm* — Roeder & Broder LLP; Steven G. Roeder

(57) ABSTRACT

A water ozonation system (18) that receives source water (16) from a water source (14) and converts it to ozonated water (20) for use in a washing machine (12) includes a system body (30), an ozone generator (38), a sensor assembly (21), and a controller (46). The system body (30) receives the source water (16) from the water source (14). The ozone generator (38) is configured to generate ozone. The ozone generator (38) is coupled the system body (30). The sensor assembly (21) is also coupled to the system body (30). The sensor assembly (21) is configured to sense at least one ambient environmental condition and generate at least one electronic data signal based on the sensed at least one ambient environmental condition. The controller (46) receives the at least one electronic data signal from the sensor assembly (21) and regulates a level of ozone that is generated by the ozone generator (38) based at least in part on the at least one electronic data signal.

32 Claims, 3 Drawing Sheets

(51) Int. Cl.
  *D06F 34/14*     (2020.01)
  *D06F 34/24*     (2020.01)
  *C25B 15/023*    (2021.01)
  *B01D 53/04*     (2006.01)
  *B01D 53/26*     (2006.01)
  *C01B 13/11*     (2006.01)
  *C02F 1/00*      (2006.01)
  *C02F 1/78*      (2006.01)
  *C25B 1/13*      (2006.01)
  *D06F 39/08*     (2006.01)
  *D06F 105/42*    (2020.01)
  *D06F 103/34*    (2020.01)
  *D06F 103/32*    (2020.01)
  *D06F 103/16*    (2020.01)

(52) U.S. Cl.
  CPC .............. *C01B 13/11* (2013.01); *C02F 1/008* (2013.01); *C02F 1/78* (2013.01); *C25B 1/13* (2013.01); *C25B 15/023* (2021.01); *D06F 33/37* (2020.02); *D06F 34/14* (2020.02); *D06F 34/24* (2020.02); *D06F 39/088* (2013.01); *B01D 2259/40096* (2013.01); *C02F 2201/782* (2013.01); *C02F 2209/02* (2013.01); *C02F 2209/03* (2013.01); *C02F 2307/12* (2013.01); *D06F 2103/16* (2020.02); *D06F 2103/32* (2020.02); *D06F 2103/34* (2020.02); *D06F 2105/42* (2020.02)

(56) References Cited

U.S. PATENT DOCUMENTS

| | | |
|---|---|---|
| 2001/0003874 A1* | 6/2001 | Gillette ............... F26B 21/083 34/169 |
| 2006/0096038 A1 | 5/2006 | Daniels et al. |
| 2009/0223904 A1 | 9/2009 | Tanny et al. |
| 2011/0168546 A1* | 7/2011 | Nemoto ............... C25B 11/097 204/290.01 |
| 2014/0033445 A1 | 2/2014 | Daniels et al. |

* cited by examiner

OZONE LAUNDRY SYSTEM

RELATED APPLICATION

This application claims priority on U.S. Provisional Application No. 62/824,672 filed on Mar. 27, 2019, and entitled "OZONE LAUNDRY SYSTEM". As far as permitted, the contents of U.S. Provisional Application No. 62/824,672 are incorporated in their entirety herein by reference.

BACKGROUND

It is well known that the use of traditional laundry systems can lead to various undesirable environmental conditions. For example, common laundry additives such as detergents, fabric softeners and bleaches typically come in plastic laundry jugs that often end up in landfills. It has been estimated that approximately seven hundred million such plastic laundry jugs end up in landfills each year. Additionally, additives such as detergents, fabric softeners and bleaches can subject the users to potential skin allergies triggered by the chemicals in such additives. Further, new studies have shown that an alarming number of tiny microfibers from synthetic clothing are making their way into our aquatic wildlife due to being washed within traditional laundry systems. On average, synthetic fleece from jackets release 1.7 grams of microfibers every wash, with older jackets shedding twice as much. Such microfibers travel to the local wastewater treatment plant where up to forty percent enter into rivers, lakes and oceans. The small fiber size allows them to be readily consumed by fish and wildlife, thus ending up in the natural food chain.

Additionally, energy utilized to heat the water in traditional laundry systems can greatly increase an individual's carbon footprint. Further, the use of traditional laundry systems can be very costly for the user due to energy costs to heat the water, as well as costs for laundry additives such as detergents, fabric softeners and bleaches. Moreover, the use of hot water as well as the additives noted above can result in increased wear and long-term damage to the fabrics used in various articles of clothing.

For many years, ozone, as a known powerful oxidizer, has been used in a wide variety of industries worldwide to control odors and kill germs, viruses, bacteria, molds and yeasts, including in wastewater plants, water parks, zoos, aquariums, food manufacturing and water bottling. Additionally, ozone laundry systems have been used commercially for over twenty years and have proven effective in places like hospitals and hotels around the world. The increased use of ozone in such industries has helped to realize many environmental and economic benefits. For example, as a powerful oxidizer, ozone is a very effective disinfecting agent for killing germs, viruses, bacteria, molds and yeasts, and eliminating odors, thus greatly reducing the need for laundry additives such as detergents, fabric softeners and bleaches. Further, ozone has proven effective in colder water, thus obviating the need to heat the water in ozone laundry systems.

Accordingly, it is desired to further improve the effectiveness of ozone laundry systems and to make them more accessible to the residential user.

SUMMARY

The present invention is directed toward a water ozonation system that receives source water from a water source and converts it to ozonated water for use in a washing machine. As provided herein, the water ozonation system can be selectively operated in multiple alternative modes of operation. In various embodiments, the water ozonation system includes a system body, an ozone generator, a sensor assembly, and a controller. The system body receives the source water from the water source. The ozone generator is configured to generate ozone. The ozone generator is coupled the system body. The sensor assembly is also coupled to the system body. The sensor assembly is configured to sense at least one ambient environmental condition and generate at least one electronic data signal based on the sensed at least one ambient environmental condition. The controller receives the at least one electronic data signal from the sensor assembly and regulates a level of ozone that is generated by the ozone generator based at least in part on the at least one electronic data signal.

In some embodiments, the water ozonation system further includes a water mixer that receives the source water from the water source and the ozone from the ozone generator, the water mixer mixing the source water and the ozone to generate the ozonated water that is used in the washing machine.

In various embodiments, the sensor assembly includes one or more of a water flow pressure sensor, an air temperature sensor, and an air humidity sensor. The water flow pressure sensor senses a wafer flow pressure of the source water within the system body, and generates an electronic data signal based on the sensed water flow pressure. The air temperature sensor senses an air temperature of ambient air, and generates a second electronic data signal based on the sensed air temperature. The air humidity sensor senses an air humidity of the ambient air, and generates a third electronic data signal based on the sensed air humidity. The controller regulates the level of ozone that is generated by the ozone generator based at least in part on the electronic data signals that are sent from the one or more of the water flow pressure sensor, the air temperature sensor and the air humidity sensor.

Additionally, or in the alternative, in some embodiments, the sensor assembly can also include a water temperature sensor that senses a water temperature of the source water, and generates a first electronic data signal based on the sensed water temperature. In such embodiments, the controller regulates the level of ozone that is generated by the ozone generator based at least in part on the first electronic data signal.

Further, in certain alternative embodiments, the ozone generator can be a corona discharge-type ozone generator, or the ozone generator can be an electrolytic cell-type ozone generator.

Additionally, in some embodiments, the water ozonation system further includes a dehumidifier that is configured to receive the ambient air and remove humidity from the ambient air prior to the ambient air being sent to the ozone generator. In certain such embodiments, the water ozonation system will run the ambient air through the dehumidifier to remove humidity from the ambient air only when certain modes of operation are selected for the water ozonation system.

Further, in certain embodiments, the dehumidifier includes a drying tower that contains a desiccant that automatically absorbs surrounding humidity from the ambient air. Still further, in one embodiment, the dehumidifier further includes an electronic heater coil and an air pump that cooperate to selectively regenerate the desiccant.

The present invention is further directed toward an ozone laundry system including a washing machine, and the water ozonation system as described above that receives source water from a water source and converts it to ozonated water for use in the washing machine.

Additionally, the present invention is further directed toward a water ozonation system including a system body that receives the source water from the water source; an ozone generator that is configured to generate ozone from ambient air, the ozone generator being coupled to the system body; and a dehumidifier that is coupled to the system body, the dehumidifier being configured to receive the ambient air and remove humidity from the ambient air prior to the ambient air being sent to the ozone generator.

The present invention is further directed toward methods for converting source water to ozonated water for use in a washing machine. For example, in one embodiment, the method includes the steps of receiving the source water from a water source within a system body; coupling an ozone generator to the system body; coupling a sensor assembly to the system body, the sensor assembly being configured to sense at least one ambient environmental condition and generate at least one electronic data signal based on the sensed at least one ambient environmental condition; receiving the at least one electronic data signal from the sensor assembly with a controller; and generating ozone with the ozone generator, a level of the ozone that is generated by the ozone generator being regulated with the controller based at least in part on the at least one electronic data signal.

Additionally, in another embodiment, the method includes the steps of receiving the source water from a water source within a system body; coupling an ozone generator to the system body; coupling a dehumidifier to the system body; receiving ambient air within the dehumidifier; and selectively removing humidity from the ambient air with the dehumidifier prior to the ambient air being sent to the ozone generator.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
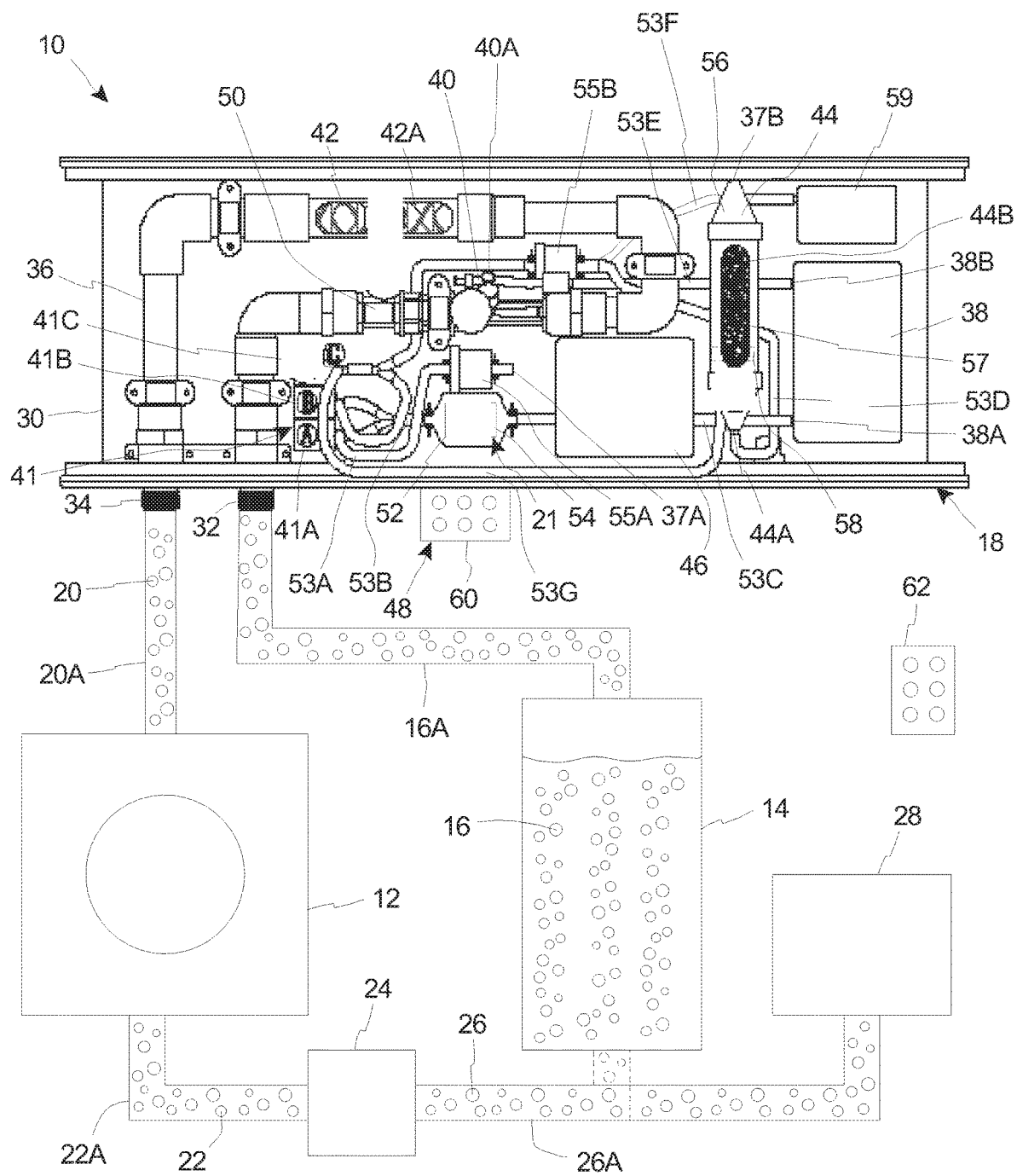
FIG. 1 is a simplified schematic illustration of an embodiment of an ozone laundry system having features of the present invention.

Embodiments of the present invention are described herein in the context of an ozone laundry system, e.g., a residential ozone laundry system, that is uniquely configured to sense the ambient environmental conditions to more precisely regulate the ozone concentration in the water during use of the ozone laundry system. More specifically, in various embodiments, the ozone laundry system incorporates the use of a water ozonation system which includes a sensor assembly that is configured to sense the ambient environmental conditions unique to each household, with the sensed ambient environmental conditions subsequently being used to regulate the concentration of dissolved ozone that is introduced into the incoming water supply of the ozone laundry system. Additionally, the ozone laundry system and/or the water ozonation system can further include a dehumidifier that is configured, when desired, to remove humidity from the ambient air prior to the use of the ambient air for ozone generation. Thus, the ozone laundry system is functional regardless if the home has low or high water pressure, regardless if the air temperature is warm or cold, regardless if the air is dry or humid, and/or regardless if the water temperature is warm or cold.

Further, the ozone laundry system and/or the water ozonation system provides the user with the ability to choose the ozone concentration level used for everyday loads, and, if desired, the user can select a mode to generate a higher ozone concentration for white loads or other situations where increased ozone concentration may be desired. In particular, in various embodiments, the ozone laundry system and/or the water ozonation system is selectively operable in multiple modes of operation, e.g., a Normal Mode, a Boost Mode and a No Ozone Mode, during a laundry washing process. Additionally, as provided herein, in certain embodiments, the water ozonation system can further include and/or be used in a Stand-By Mode and a Dry Mode. Further and/or alternatively, the ozone laundry system and/or the water ozonation system can have more or fewer modes of operation.

It is appreciated that each selectable mode of operation during a laundry washing process, e.g., the Normal Mode, the Boost Mode and the No Ozone Mode, incorporates a fluid flow path and an air flow path. Additionally, as described in detail herein below, it is further appreciated that the Dry Mode will also incorporate a particular air flow path.

Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same or similar nomenclature and/or reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application-related and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

FIG. 1 is a simplified schematic illustration of an embodiment of an ozone laundry system 10, e.g., a residential ozone laundry system, having features of the present invention. The design of the ozone laundry system 10 can be varied. In various embodiments, as shown, the ozone laundry system 10 includes a washing machine 12, a water source 14 that is configured to supply source water 16, and a water ozonation system 18. As provided herein, the water ozonation system 18 is configured to introduce a desired concentration of ozone into the source water 16 from the water source 14 to generate ozonated water 20 that is subsequently provided for use within the washing machine 12. Additionally, or in the alternative, the ozone laundry system 10 can have more components or fewer components than what is illustrated and described herein, and/or each of the components of the ozone laundry system 10 can have a somewhat different design and function than what is described in detail herein.

As an overview, the water ozonation system 18 is configured to introduce dissolved ozone into the incoming source water 16 from the water source 14 at selected concentration levels (or within approximate concentration ranges) to generate desired ozonated water 20 before such ozonated water 20 is supplied to the washing machine 12. More specifically, in various embodiments, the water ozonation system 18 is provided in the form of a module, e.g., a wall-hung module, that can be used, without environmental calibration or any other manual adjustments or selections to the module, with any existing residential washing machine regardless of whether the washing machine is low-flow, high-flow, top-load or front-load, and regardless of the particular ambient environmental conditions that exist where the washing machine 12 is being used. In such embodiments, the water ozonation system 18 can include a sensor assembly 21 that includes one or more sensors for sensing the ambient environmental conditions that exist where the washing machine 12 is being used. The water ozonation system 18 can then utilize the sensed ambient environmental conditions to generate ozonated water 20 approximately at desired ozone concentration levels for more effective use within the washing machine 12 of the ozone laundry system 10.

Additionally, the ozone laundry system 10 and/or the water ozonation system 18 is configured to provide various environmental and financial benefits to the user. For example, since ozone is such a powerful oxidizer, which can effectively destroy germs, bacteria, molds, viruses and yeasts, the ozone laundry system 10 can be operated without the need for additives such as detergents, fabric softeners or chemical bleach. Further, the ozone laundry system 10 can effectively clean clothes as desired without the need for hot water in the laundry process. Thus, without the need for detergents, fabric softeners, chemical bleach or hot water, the user can achieve substantial cost savings, as well as inhibiting polluted wastewater from entering into rivers, lakes and oceans, and lessening the number of plastic laundry jugs that end up in landfills.

Further, as provided herein, it is appreciated that the ozone laundry system 10 can be provided in the form of an open-loop system or a closed-loop system. More particularly, in one embodiment of an open-loop system, the ozonated water 20 utilized within the washing machine 12 is expended as expended water 22 that is passed through a filtration system 24 to generate filtered water 26 that is then transmitted to a disposal system 28, e.g., a sewer system, for proper disposal. Alternatively, in one embodiment of a closed-loop system, the ozonated water 20 utilized within the washing machine 12 is expended as expended water 22 that is passed through the filtration system 24 to generate filtered water 26 that is then transmitted back to the water source 14 so that the filtered water 26 can again be utilized as source water 16 for the ozone laundry system 10.

As noted, it is further appreciated that the ozone laundry system 10 includes a fluid flow path that requires various fluid or water conduits through which water flows within and between the various components of the ozone laundry system 10. For example, as shown in FIG. 1, (i) the source water 16 from the fluid source 14 flows through an inlet conduit 16A (or source water conduit) to the water ozonation system 18; (ii) the water, i.e. the source water 16 and/or the ozonated water 20, flows through an internal water conduit 36 within the water ozonation system 18 from a system inlet 32 to a system outlet 34; (iii) the ozonated water 20 from the water ozonation system 18 flows through an outlet conduit 20A (or ozonated water conduit) to the washing machine 12; (iv) the expended water 22 from the washing machine 12 flows through an expended water conduit 22A to the filtration system 24; and (v) the filtered water 26 from the filtration system 24 flows through a filtered water conduit 26A to either the disposal system 28 (i.e. in an open-loop system) or the fluid source 14 (i.e. in a closed-loop system).

As shown in FIG. 1, the path of the filtered water 26 from the filtration system 24 to the disposal system 28 is shown in solid lines. Additionally, the path of the filtered water 26 from the filtration system 24 back to the water source 14 is shown in part in dashed lines. Stated in another manner, a part of the filtered water conduit 26A in a closed-loop system is illustrated in dashed lines.

It is appreciated that the various noted water conduits, i.e. the inlet conduit 16A, the internal water conduit 36, the outlet conduit 20A, the expended water conduit 22A, and the filtered water conduit 26A, can have any suitable configuration and/or can be formed from any suitable materials.

It is further appreciated that, in many embodiments, the fluid flow path through the ozone laundry system 10 will be substantially identical regardless of whether the ozone laundry system 10 and/or the water ozonation system 18 is being used in Normal Mode, Boost Mode or No Ozone Mode.

Additionally, as noted above, it is further appreciated that the water ozonation system 18 will also have an air flow path for purposes of generating and then utilizing the desired level of ozone to be injected into the source water 16 to generate the desired ozonated water 20. Alternative air flow paths depending on the particular mode of operation of the water ozonation system 18 will be described in greater detail herein below.

As noted, the water ozonation system 18 is configured to provide ozonated water 20 to the washing machine 12 that includes a target (or desired) concentration level of ozone within the ozonated water 20 so that the washing machine 12 can more effectively and efficiently clean the laundry within the washing machine 12. As provided herein, however, it is appreciated that the actual concentration level of ozone within the ozonated water 20 can vary slightly from the target concentration level. For example, in some non-exclusive alternative embodiments, the actual concentration level of ozone within the ozonated water 20 can vary by approximately one percent, two percent, three percent, five percent, seven percent or ten percent from the target (or desired) concentration level. As such, any mention herein of a target or desired concentration level is interpreted to incorporate such an approximate range of target or desired concentration levels.

The design of the water ozonation system 18 can be varied to suit the requirements of the ozone laundry system 10. In various embodiments, as illustrated in FIG. 1, the water ozonation system 18 can include a system body 30 including the system inlet 32 and the system outlet 34; the internal water conduit 36; the sensor assembly 21; a first air inlet 37A; a second air inlet 37B; an ozone generator 38; a gas mover 40; an air path control system 41; a water mixer 42; a dehumidifier 44; a controller 46; and a user control system 48. Alternatively, the water ozonation system 18 can include more components or fewer components than those specifically listed herein and illustrated in FIG. 1.

Additionally, as noted above and as described in greater detail herein below, the water ozonation system 18 can be configured to operate in multiple alternative modes of operation. For example, in certain embodiments, the water ozonation system 18 can include (i) a "Stand-By Mode", where the water ozonation system 18 is properly connected and powered, e.g., 120v AC, the water lines are properly affixed, and the water is pressurized, such that the water ozonation system 18 is ready for use; (ii) a "Normal Mode", where the water ozonation system 18 will operate under normal, e.g., factory default, settings to provide a target ozone concentration level for the ozonated water 20; (iii) a "Boost Mode", where the water ozonation system 18 will operate to provide a desired ozone concentration level for the ozonated water 20 that is higher than in the Normal Mode; and (iv) a "No Ozone Mode", where the water ozonation system 18 will operate without generating and inputting any ozone into the source water 16. As described herein, in some embodiments, the user of the ozone laundry system 10 can control when the water ozonation system 18 is used in the Normal Mode, the Boost Mode or the No Ozone Mode, i.e. via the user control system 48. Additionally, in controlling the particular mode of operation for the water ozonation system 18, the user can alter the default settings so that the water ozonation system 18 can default to use in any of the Normal Mode, the Boost Mode and/or the No Ozone Mode.

The system body 30 is configured to provide a housing or base for various components of the water ozonation system 18. Stated in another manner, as shown, various components of the water ozonation system 18, e.g., at least the internal water conduit 36, the sensor assembly 21, the first air inlet 37A, the second air inlet 37B, the ozone generator 38, the gas mover 40, the air path control system 41, the water mixer 42, the dehumidifier 44, and the controller 46, are coupled to the system body 30. In some such embodiments, one or more of such components can be positioned substantially within the system body 30.

The system body 30 can have any suitable design. For example, in some embodiments, the system body 30 is substantially rectangular box-shaped. Alternatively, the system body 30 can have another suitable shape.

Additionally, the system body 30 can be formed from any suitable materials. For example, in certain embodiments, the system body 30 is formed substantially from stainless steel. Alternatively, the system body 30 can be formed from other suitable materials.

As shown in FIG. 1, the source water 16 is supplied to the water ozonation system 18 through the system inlet 32. More particularly, as illustrated, the inlet conduit 16A (i.e. the source water conduit) is coupled in fluid communication with the system inlet 32 so that the source water 16 can be effectively introduced into the water ozonation system 18 via the inlet conduit 16A and the system inlet 32. Additionally, the ozonated water 20 leaves the water ozonation system 18 through the system outlet 34. More particularly, as illustrated, the outlet conduit 20A (i.e. the ozonated water conduit) is coupled in fluid communication with the system outlet 34 so that the ozonated water 20 can be directed through the system outlet 34 and the outlet conduit 20A to the washing machine 12.

Further, the internal water conduit 36 guides the flow of the source water 16 and/or the ozonated water 20 through and/or adjacent to the system body 30 of the water ozonation system 18. More specifically, the source water 16 that is introduced into the water ozonation system 18, i.e. via the system inlet 32, is transmitted through and/or adjacent to the system body 30 within the internal water conduit 36 before being converted into ozonated water 20, e.g., within the water mixer 42. The ozonated water 20 is then further transmitted within the internal water conduit 36 through and/or adjacent to the system body 30 toward the system outlet 34 through which the ozonated water 20 leaves the water ozonation system 18.

It is appreciated that the internal water conduit 36 can have any suitable configuration for guiding the source water 16 and/or the ozonated water 20 through the water ozonation system 18. Additionally, the internal water conduit 36 can be formed from any suitable materials.

As provided herein, the water ozonation system 18 includes the sensor assembly 21 that is uniquely configured to sense various ambient environmental conditions so that the controller 46 is able to better control the desired ozone concentration within the ozonated water 20 to be used within the washing machine 12. In some embodiments, as illustrated in FIG. 1, the sensor assembly 21 can include one or more of a water flow pressure sensor 50, an air temperature sensor 52, and an air humidity sensor 54. As described in detail herein, the ambient sensors 50, 52, 54 collect data that is used to regulate the variable output of the ozone generator 38, i.e. the sensed ambient data is used by the controller 46 to determine the desired output of the ozone generator 38 for introducing target or desired concentration levels of ozone within the ozonated water 20. Alternatively, the sensor assembly 21 can be configured to include more individual sensors or fewer individual sensors than what is specifically illustrated and described in relation to FIG. 1.

The water flow pressure sensor 50 is configured to sense the flow rate and/or flow pressure of the incoming source water 16. More particularly, after entering the system body 30, the source water 16 is directed through and/or adjacent to the water flow pressure sensor 50, which collects data on the water flow rate and/or water flow pressure of the source water 16. The water flow pressure sensor 50 then sends an electronic data signal to the controller 46 based on the sensed water flow rate and/or water flow pressure. The electronic data signal from the water flow sensor 50 provides an initial indication to the controller 46 that operation of the ozone generator 38 is needed (unless the ozone laundry system 10 is being operated in the No Ozone Mode), thus triggering the water ozonation system 18 out of Stand-By Mode. It is appreciated that in certain embodiments, the water ozonation system 18 has no specific on/off functionality. Thus, in such embodiments, once the water ozonation system 18 is properly connected, as noted above, the water ozonation system 18 is always in Stand-By Mode until triggered to operate by the demand of water running through it.

Additionally, the controller 46 then uses the electronic data signal from the water flow pressure sensor 50, and any other sensor data, to determine the amount of ozone that is needed to be generated by the ozone generator 38 so that a final target or desired dissolved ozone concentration level in the ozonated water 20 can be achieved. Stated in another manner, the controller 46 regulates the level of ozone that is generated by the ozone generator 38, i.e. by controlling the voltage being sent to the ozone generator 38, based at least in part on the electronic data signal received from the water flow pressure sensor 50. It is appreciated that, generally, the higher the water flow rate and/or water flow pressure, the more ozone that needs to be generated (and the more voltage that needs to be sent to the ozone generator 38 to generate such level of ozone) to provide the desired concentration of ozone within the ozonated water 20. Additionally, it is further appreciated that the specific level of ozone to be generated by the ozone generator 38 is also dependent on the particular mode of operation for the water ozonation system 18.

As illustrated in FIG. 1, the operation of the air temperature sensor 52 and the air humidity sensor 54 are dependent upon ambient air being drawn into the water ozonation system 18. In various embodiments and/or in certain modes of operation, e.g., in Normal Mode, ambient air is initially drawn into the water ozonation system 18, i.e. into the system body 30, via the first air inlet 37A. More specifically, the gas mover 40 operates to create a vacuum pressure source through the air path to draw the ambient air into the water ozonation system 18. The design of the gas mover 40 can be varied to suit the requirements of the water ozonation system 18. In one embodiment, the gas mover 40 can be in the form of a jet venturi device that provides a vacuum pressure source to draw the ambient air into the water ozonation system 18 via the first air inlet 37A. Alternatively, the gas mover 40 can be provided in another suitable form to move the air into and through the water ozonation system 18.

In some embodiments, after the ambient air is drawn into the water ozonation system 18, e.g., into a first air flow conduit 53A via the first air inlet 37A, the ambient air can be passed through a first pre-filter 55A to remove any unwanted dust and debris in the ambient air that may adversely impact the operation of the water ozonation system 18.

After passing through the first pre-filter 55A, the ambient air is directed through a second air flow conduit 53B toward the air temperature sensor 52 and/or the air humidity sensor 54 by the air path control system 41. More specifically, the air path control system 41 can include a plurality of air path control valves, e.g., a first air path control valve 41A, a second air path control valve 41B and a third air path control valve 41C. To properly direct the ambient air toward the air temperature sensor 52 and/or the air humidity sensor 54, the first air path control valve 41A, e.g., a solenoid valve, can be open, while the second air path control valve 41B and the third air path control valve 41C are closed.

The air temperature sensor 52 collects data on the ambient air temperature prior to entry of the air into the ozone generator 38. The air temperature sensor 52 then sends an electronic data signal to the controller 46 based on the sensed ambient air temperature. The controller 46 uses the electronic data signal from the air temperature sensor 52, along with any other sensor data, to determine the proper voltage needed by the ozone generator 38 to produce the target or desired amount of ozone to achieve a stable and consistent dissolved ozone concentration within the ozonated water 20. It is appreciated that, generally, the hotter the air temperature, the more voltage that is required by the ozone generator 38 to generate the desired level of ozone within the ozonated water 20.

Somewhat similarly, the air humidity sensor 54 collects data on the ambient air humidity prior to entry of the air into the ozone generator 38. The air humidity sensor 54 then sends an electronic data signal to the controller 46 based on the sensed ambient air humidity. As with the other sensors 50, 52, the controller 46 uses the electronic data signal from the air humidity sensor 54 to determine the proper voltage needed by the ozone generator 38 to produce the target or desired amount of ozone to achieve a stable and consistent dissolved ozone concentration level within the ozonated water 20.

Additionally, in one non-exclusive alternative embodiment, the electronic data signal from the air humidity sensor 54 can further be utilized by the controller to determine whether or not the incoming air needs to be dehumidified, e.g., whether or not the ambient air humidity exceeds a certain predetermined humidity threshold, e.g., fifty percent humidity. In such embodiment, the ambient air can be directed through the dehumidifier 44 prior to being directed into the ozone generator 38 if the ambient air humidity exceeds the predetermined humidity threshold.

Alternatively, in various embodiments and/or in certain modes of operation, e.g., Boost Mode, the ambient air is directed by the second air path control valve 41B to be processed by the dehumidifier 44 prior to being directed into the ozone generator 38. More particularly, in such instances, the first air path control valve 41A is now closed, and the second air path control valve 41B is now opened (with the third air path control valve 41C remaining closed) to control the air flow path. With the second air path control valve 41B open, the ambient air is now drawn into the water ozonation system 18, i.e. through use of the gas mover 40, via the second air inlet 37B at the top of the dehumidifier 44. As will described in greater detail herein below, the ambient air traverses the dehumidifier, which 44 removes undesired humidity from the ambient air. The dehumidified air is then directed out the bottom of the dehumidifier 44, through dehumidifier outlet 44A, and through a fourth air flow conduit 53D toward a second pre-filter 55B to remove any unwanted dust and debris in the dehumidified air that may adversely impact the operation of the water ozonation system 18. With the second air path control valve 41B open, the dehumidified air then continues through the fourth air flow conduit 53D before merging into the second air flow conduit 53B that directs the dehumidified air to the air temperature sensor 52 and the air humidity sensor 54, where the air temperature and the air humidity are sensed, with appropriate electronic data signals being sent to the controller 46. Subsequently, the dehumidified air is directed through the third air flow conduit 53C to the ozone generator 38 where the dehumidified air enters the ozone generator 38 via the generator inlet 38A.

The ozone generator 38 is configured to generate a desired amount of ozone that can be injected into the source water 16 so that the ozonated water 20 has a target or desired level of ozone concentration. Additionally, the ozone generator 38 can have any suitable design. In one non-exclusive embodiment, the ozone generator 38 can be a corona discharge-type ozone generator that receives voltage or current in a desired level as controlled by the controller 46, which breaks down some of the oxygen gas, $O_2$, in the ambient air into individual oxygen molecules, O, that can bond with the $O_2$ to generate the ozone, $O_3$. Alternatively, in another non-exclusive embodiment, the ozone generator 38 can be an electrolytic cell-type ozone generator that includes an electrolytic cell that is positioned directly within a volume of the source water 16. In such embodiment, the electrolytic cell is configured to break down at least a portion of the source water 16 into its component parts, i.e. hydrogen and oxygen, and then converts at least a portion of the liberated oxygen into ozone, with the ozone then being directly dissolved into the source water 16 to provide the desired ozonated water 20. Still alternatively, the ozone generator 38 can have another suitable design.

It is appreciated that the actual level of ozone that is generated by the ozone generator 38 for any particular use of the water ozonation system 18 can be varied as desired based on the requirements of the ozone laundry system 10. Additionally, as noted, it is also appreciated that the actual ozone level can vary slightly from the desired ozone level during the ozone generation process. It is further appreciated that, as noted above, specific locations of use for the water ozonation system 18 can have different ambient room conditions of varied air temperature, humidity, and water source pressures (PSI), which impact the desired level of ozone generation, e.g., as determined by the controller 46. For example, ozone generated by corona discharge is greatly influenced by the temperature and humidity of the air. Additionally, varied water pressure will also require varied ozone concentration in order to meet the requirements of a desired final dissolved ozone concentration in the ozonated water 20. Thus, in order to maintain a stable and consistent final dissolved ozone concentration in the ozonated water 20, the ozone generator 38 must react to the ambient conditions mentioned and adjust its output accordingly. Further, as noted, the desired output of ozone from the ozone generator 38 is determined based on the sensed data from one or more of the sensors 50, 52, 54 of the sensor assembly 21, as evaluated by the controller 46. More particularly, the controller 46 uses the sensed data from one or more of the sensors 50, 52, 54 of the sensor assembly 21, and varies the voltage to the ozone generator 38 in order to effectively control the specific output of ozone from the ozone generator 38. In various embodiments, as described below, the controller 46 can use a specially designed algorithm that receives and interprets the electronic data signals from one or more of the water flow pressure sensor 50, the air temperature sensor 52 and the air humidity sensor 54, to selectively adjust the appropriate voltage supply to the ozone generator 38 so that the desired amount of ozone is generated to thus provide the target or desired ozone concentration level within the ozonated water 20.

In addition to drawing the ambient air into the water ozonation system 18, the gas mover 40 is further configured to extract ozone gas from the ozone generator 38, i.e. via generator outlet 38B near the top of the ozone generator 38. The gas mover 40 draws the ozone gas through a fifth air flow conduit 53E from the ozone generator 38 to the gas mover 40 and then injects the ozone gas via mover port 40A into the internal water conduit 36 with the source water 16. The ozone gas and the source water 16 then continue through the internal water conduit 36 to the water mixer 42. In some embodiments, the gas mover 40 can further include valves on either side of the mover port 40A that inhibit back flow of the ozone gas and also inhibit flow of the source water 16 into the fifth air flow conduit 53E.

The water mixer 42 is configured to fully mix the source water 16 and the ozone from the ozone generator 38, so as to dissolve the ozone into the source water 16 to generate the ozonated water 20, i.e. so that the source water 16 is effectively converted into the ozonated water 20, having the target or desired ozone concentration level that will be used in the washing machine 12. The water mixer 42 can have any suitable design for purposes of effectively and completely mixing the source water 16 and the ozone as desired to provide the ozonated water 20 having the desired ozone concentration level.

Additionally, in some embodiments, the water mixer 42 can include a mixer window 42A that enables the user to better and more effectively monitor operation of the water ozonation system 18. The mixer window 42A provides visual access to the water flow through the water ozonation system 18 and mixing of the source water 16 and the ozone within the water mixer 42. In some embodiments, the mixer window 42A can be backlit by two different LED colors, e.g., BLUE or anther suitable color for when the Normal Mode setting is chosen, and GREEN or another suitable color for when the Boost Mode setting is chosen. Alternatively, the mixer window 42A can allow a different manner of visual indication between modes of operation.

As provided herein, the mixer window 42A has three basic purposes: (1) provides ability of visual observance of water flow through the water ozonation system 18 as well as the ozone bubbles being mixed or dissolved into the source water 16 to generate the ozonated water 20 before the ozonated water 20 is directed toward and enters the washing machine 12; (ii) provides a quick backlit color reference (or other indicator) to know what ozone concentration setting has been selected and is in use (e.g., BLUE=Normal Mode, GREEN=Boost Mode, No Backlit=No Ozone Mode); and (iii) provides exciting interactive graphic aspects to the aesthetics of the water ozonation system 18.

Additionally, as noted, the water ozonation system 18 further includes the dehumidifier 44 that is coupled to the system body 30. It is appreciated that incoming air to the ozone generator 38 is sensitive to air humidity. The more humid the air, the less ozone will be generated by the ozone generator 38 under the same supplied voltage. Therefore, in certain embodiments and/or in some modes of operation in order to have a stable dissolved ozone concentration in high humidity ambient environments, the on-board dehumidifier 44 is needed to reduce the humidity of the ambient air (in such high humidity environments) prior to ozone generation so that a desired amount of ozone gas can be produced. For example, in some embodiments, the dehumidifier 44 is only used when the Boost Mode setting of ozone concentration is selected. Thus, in such embodiments, when the Normal Mode ozone concentration setting is chosen by the user, the incoming air will always bypass the dehumidifier 44. Conversely, in such embodiments, when the Boost Mode ozone concentration setting is chosen, the air path control system 41 can be used to effectively divert the incoming air as desired, e.g., through the dehumidifier 44 before being directed to the ozone generator 38 and/or substantially directly into the ozone generator 38.

The design of the on-board dehumidifier 44 can be varied. In certain embodiments, the dehumidifier 44 includes a drying tower 56 that contains a drying agent, e.g., a desiccant 57, that automatically absorbs surrounding humidity. More specifically, as air is passed through the drying tower 56, the humidity is automatically absorbed by the desiccant 57 and thus removed from the air. Thus, the excess humidity is then retained within the desiccant 57. In some such embodiments, when the desiccant 57 is fully dry it is cobalt blue in color (or another suitable color). Additionally, in such embodiments, when the desiccant 57 has absorbed as much humidity as it can, the desiccant 57 will turn clear to pink in color (or another suitable color).

Additionally, in various embodiments, the dehumidifier 44 incorporates a unique design that enables the desiccant 57 to be effectively self-regenerating. More specifically, in such embodiments, the dehumidifier 44 can be operated to remove the humidity from the desiccant 57, thus regenerating the desiccant 57 so that it can be continuously used without need for replacement. The regenerating process can be performed in any suitable manner. In some such embodiments, the dehumidifier 44 can further include a built-in electronic heating coil 58 (illustrated in phantom) and an on-board air pump 59. During the regeneration process, the heating coil 58 operates to heat the desiccant 57, and then the air pump 59 blows air out through the dehumidifier 44. More specifically, during operation, the heating coil 58 will heat for a moment and then the air pump 59 will run for a moment. This cycle of heating followed by air pumping will repeat for a designated period of time, e.g., up to two hours per completed cycle, which would complete a full cycle of dehumidifying the desiccant 57.

It is appreciated that the process of drying out of the desiccant 57 can be manually selected by the user, e.g., through the user control system 48, or automatically based on settings of the water ozonation system 18. For example, in some non-exclusive embodiments, the water ozonation system 18 can be designed such that the desiccant self-regeneration process runs after every one, two, three, four or five uses of the dehumidifier 44. As noted, the drying out or self-regeneration of the desiccant 57, either automatically or through manual selection, can sometimes be referred to as the "Dry Mode" of operation.

The air flow path for the desiccant self-regeneration process will now be described. For operation of the desiccant self-regeneration process, the third air path control valve 41C is now opened, while the first air path control valve 41A and the second air path control valve 41 B are closed. With the third air path control valve 41C open, air is pumped out from the air pump 59 through a sixth air flow conduit 53F before the pumped air travels through the second pre-filter 55B to remove any unwanted impurities. The pumped air is then directed in through the bottom of the drying tower 56, i.e. through outlet 44A, such that the pumped air is going in the reverse direction through the dehumidifier 44. The pumped air blows through the desiccant 57 removing the humidity and pushing the humidity out through the top of the dehumidifier 44.

As described, the desiccant self-regeneration process dries out the desiccant 57 and returns its condition back to a fully dry state. This dehumidifying process can occur again and again for the life of the dehumidifier 44 without the need for any maintenance or replacement parts. Stated in another manner, the dehumidifier 44 includes a built-in, self-regenerating, desiccant dryer pack that does not require replacing over the life of the dehumidifier 44.

Additionally, as shown, the dehumidifier 44 can also include a dehumidifier window 44B that provides visual access to the dehumidifier 44 and desiccant dryer agent 57. With the dehumidifier window 44B, the user is able to visualize and appreciate the status of the desiccant 57 within the dehumidifier 44. As noted above, in one non-exclusive alternative embodiment, when the desiccant 57 is cobalt blue it is fully dry. Further, in such embodiment, when the desiccant 57 is clear to pink it is indicating that the dehumidifier 44 needs to run its self-regenerating dryer utility.

The general air flow paths into and through the water ozonation system 18 will now be summarized for instances when it is not necessary or desired to remove humidity from the ambient air, e.g., when operating in Normal Mode, and when it is necessary or desired to remove humidity from the ambient air, e.g., when operating in Boost Mode.

In Normal Mode and/or when the dehumidifier is not required, the first air path control valve 41A is open and the other air path control valves 41B, 41C are closed. With the first air path control valve 41A open, the ambient air is drawn in through the first air inlet 37A into the first air flow conduit 53A to travel through the first pre-filter 55A. The ambient air then continues through open first air path control valve 41A and into the second air flow conduit 53B to the air temperature sensor 52 and the air humidity sensor 54. Not needing to dehumidify the ambient air, the ambient air is then directed through the third air flow conduit 53C to the ozone generator 38. The ambient air enters the ozone generator 38 through the generator inlet 38A. The ozone generated within the ozone generator 38 then is drawn out of the ozone generator 38 through the generator outlet 38B, and the ozone travels through the fifth air flow conduit 53E to the gas mover 40 and the mover port 40A. The ozone is then injected into the internal water conduit 16 through the mover port 40A.

In the Boost Mode and/or when use of the dehumidifier is desired, the second air path control valve 41B is open and the other air path control valves 41A, 41C are closed. With the second air path control valve 41B open, ambient air is drawn in through the second air inlet 37B at the top of the dehumidifier 44. The air is dehumidified within the dehumidifier 44 to provide dehumidified air which is then drawn out of the dehumidifier 44 through the dehumidifier outlet 44A at the bottom of the dehumidifier 44. The dehumidified air is then drawn through the fourth air flow conduit 53D and through the second pre-filter 55B. With the second air path control valve 41 B still open and the other air path control valves 41A, 41C still closed, the dehumidified air then continues through the fourth air flow conduit 53D before it merges into the second air flow conduit 53B. The dehumidified air then continues through the second air flow conduit 53B to the air temperature sensor 52 and the air humidity sensor 54. With the dehumidified air being properly dehumidified, the dehumidified air is then directed through the third air flow conduit 53C to the ozone generator 38. The dehumidified air enters the ozone generator 38 through the generator inlet 38A. The ozone generated within the ozone generator 38 then is drawn out of the ozone generator 38 through the generator outlet 38B, and the ozone travels through the fifth air flow conduit 53E to the gas mover 40 and the mover port 40A. The ozone is then injected into the internal water conduit 16 through the mover port 40A.

As described, the controller 46 receives input from the sensor assembly 21 and determines the desired and/or preferred ozone concentration level within the ozonated water 20 based at least in part on the input from the sensor assembly 21, i.e. based at least in part on the input electronic data signals from one or more of the water flow pressure sensor 50, the air temperature sensor 52, and the air humidity sensor 54. As described above, the three sensors 50, 52, 54 of the sensor assembly 21 will send their respective data to the controller 46. The controller 46 then utilizes a specially designed algorithm to determine the amount of ozone that needs to be generated by the ozone generator 38, i.e. so that the source water 16 can be converted to the ozonated water 20 having a desired concentration level of ozone. The controller 46 then sends the needed amount of voltage to the ozone generator 38 so that a specific amount of ozone will be generated to be mixed into the source water 16 to provide the desired dissolved ozone concentration target level within the ozonated water 20.

Further, in some embodiments, the controller 46 can automatically detect and adjust for high-efficiency front-load or traditional high water volume top-load machines without the user needing to select such options.

The user control system 48 is configured to enable the user to exercise some measure of control over the operation of the water ozonation system 18. For example, in various embodiments, the user control system 48 enables the user to select from the different modes of operation as described herein.

As mentioned above, the controller 46 and/or the user control system 48 can enable the water ozonation system 18 to operate in certain modes of operation. For example, in some embodiments, the water ozonation system 18 can be configured to operate in a "Stand-By Mode", a "Normal Mode", a "Boost Mode", and a "No Ozone Mode". Alternatively, the water ozonation system 18 can be configured to operate with more or fewer modes of operation.

The "Stand-By Mode" is when the water ozonation system 18 is powered and all necessary water lines are properly attached and pressurized with water. The water ozonation system 18 is thus ready for use as needed. It is appreciated that the water ozonation system 18 will typically automatically come out of Stand-By Mode as soon as the washing machine 12 demands water from the water source 14.

The "Normal Mode" of operation is when the water ozonation system 18 will generate a preset target dissolved ozone concentration level for the ozonated water 20. For example, in some embodiments, the target dissolved ozone concentration level for the ozonated water 20 in Normal Mode is approximately 0.5 ppm. In certain such embodiments, the water ozonation system 18 may have a factory default to this setting, and thus the water ozonation system 18 will automatically run this setting once the water flow pressure sensor 50 is triggered by water flowing through the water ozonation system 18, unless a different mode has been specifically selected. It is appreciated that the user is able to change the factory default setting so that the water ozonation system 18 defaults to run in any of the Normal Mode, the Boost Mode or the No Ozone Mode.

The "Boost Mode" of operation is when the water ozonation system 18 will generate an increased ozone concentration level for the ozonated water 20 relative to the Normal Mode. For example, in some embodiments, when in Boost Mode, the water ozonation system 18 can be configured to generate a target dissolved ozone concentration level for the ozonated water 20 of approximately 1.0 ppm. It is appreciated that if Boost Mode is specifically selected, or if the factory default is changed to this setting, the water ozonation system 18 will automatically run this setting once the water flow pressure sensor 50 is triggered by water flowing through the water ozonation system 18.

It is appreciated that the specific ozone concentration levels for the ozonated water 20 can be different than what is specifically mentioned above in the Normal Mode and/or the Boost Mode. More specifically, the ozone concentration level for the ozonated water 20 in Normal Mode can alternatively be greater than or less than 0.5 ppm; and/or the ozone concentration level for the ozonated water 20 in Boost Mode can alternatively be greater than or less than 1.0 ppm. For example, in some non-exclusive alternative embodiments, the target or desired ozone concentration level for the ozonated water 20 in Normal Mode can be approximately 0.25 ppm, 0.3 ppm, 0.4 ppm, 0.6 ppm, 0.7 ppm, 0.8 ppm, 0.9 ppm, 1.0 ppm, or another appropriate ozone concentration level. Additionally, in certain non-exclusive alternative embodiments, the target or desired ozone concentration level for the ozonated water 20 in Boost Mode can be approximately 0.5 ppm, 0.6 ppm, 0.7 ppm, 0.8 ppm, 0.9 ppm, 1.1 ppm, 1.2 ppm, 1.3 ppm, 1.4, ppm, 1.5 ppm, 1.6 ppm, 1.7 ppm, 1.8 ppm, 1.9 ppm, 2.0 ppm, or another appropriate ozone concentration level.

The "No Ozone Mode" of operation is when the water ozonation system 18 will not generate any ozone for a particular use of the ozone laundry system 10. It is appreciated that if the No Ozone Mode is specifically selected, or if the factory default is changed to this setting, the water ozonation system 18 will automatically run this setting once the water flow pressure sensor 50 is triggered by water flowing through the water ozonation system 18. It is further appreciated that if the ozone laundry system 10 is being used in the No Ozone Mode, the ozonated water 20 will not actually have any dissolved ozone therein. However, for convenience, any source water 16 that has been transmitted through the water ozonation system 18 for the potential introduction of ozone into the source water 16 will still be referred to as ozonated water 20 regardless of whether there is actually any ozone in the water, i.e. regardless of whether the ozone laundry system 10 is being used in the No Ozone Mode.

The design of the user control system 48 can be varied. For example, in some embodiments, the user control system 48 can include one or more of a control panel 60 that is coupled to the system body 30 of the water ozonation system 18, and a remote control 62, e.g., a radio frequency remote control, that is positioned remotely from the system body 30 of the water ozonation system 18. In such embodiments, each of the control panel 60 and the remote control 62 can include a touch screen and/or one or mover knobs or buttons. Thus, in such embodiments, the user can utilize the control panel 60 and/or the remote control 62 to better enable the user to control certain functioning of the water ozonation system 18 and/or the ozone laundry system 10. More specifically, with this design, the user can operate the user control system 48 to select the desired mode of operation for the ozone laundry system 10 and/or the water ozonation system 18.

In certain embodiments, the user can use appropriate buttons on the control panel 60 and/or the remote control 62 to choose between different modes of operation, e.g., Normal Mode, Boost Mode and/or No Ozone Mode. For example, the user can choose Normal Mode (e.g., targeted 0.5 ppm ozone concentration level in the ozonated water 20) for washing colors; and the user can choose Boost Mode (e.g., targeted 1.0 ppm ozone concentration level in the ozonated water 20) for washing whites. As noted above, the actual ozone concentration level in the ozonated water 20 can vary slightly from the target ozone concentration level.

Additionally, in some embodiments, the water ozonation system 18 can have a factory default for using the Normal Mode. Thus, in such embodiments, the water ozonation system 18 will be used in Normal Mode unless the user specifically selects otherwise. However, in such embodiments, the user is still free to choose among the different modes of operation for any given use of the water ozonation system 18 and/or the ozone laundry system 10.

Further, in certain embodiments, the user control system 48, i.e. the control panel 60 and/or the remote control 62, can include various visual and/or audio indicators to the user about the selections made and the actual operation of the water ozonation system 18. For example, the user control system 48 can employ a multi-color backlit display, e.g., a multi-color LED touch screen display, where different modes of operation as selected are displayed in different colors. Additionally, or in the alternative, the user control system 48 can provide appropriate audio signals to the user as the user selects between different modes of operation.

Additionally, in certain embodiments, the user control system 48 can further provide the user with an option of manual dehumidifier regeneration, i.e. the user can manually select the Dry Mode. It is appreciated that the purpose for enabling a manual selection for dehumidifier regeneration is for when the user may have a visual indication, e.g., an observation of the desiccant agent turning pink as viewed through the dehumidifier window 44A, that the desiccant pack needs to be dried out. It is further appreciated that the heater cycle will not function when water is flowing through the water ozonation system 18.

Figure 2:
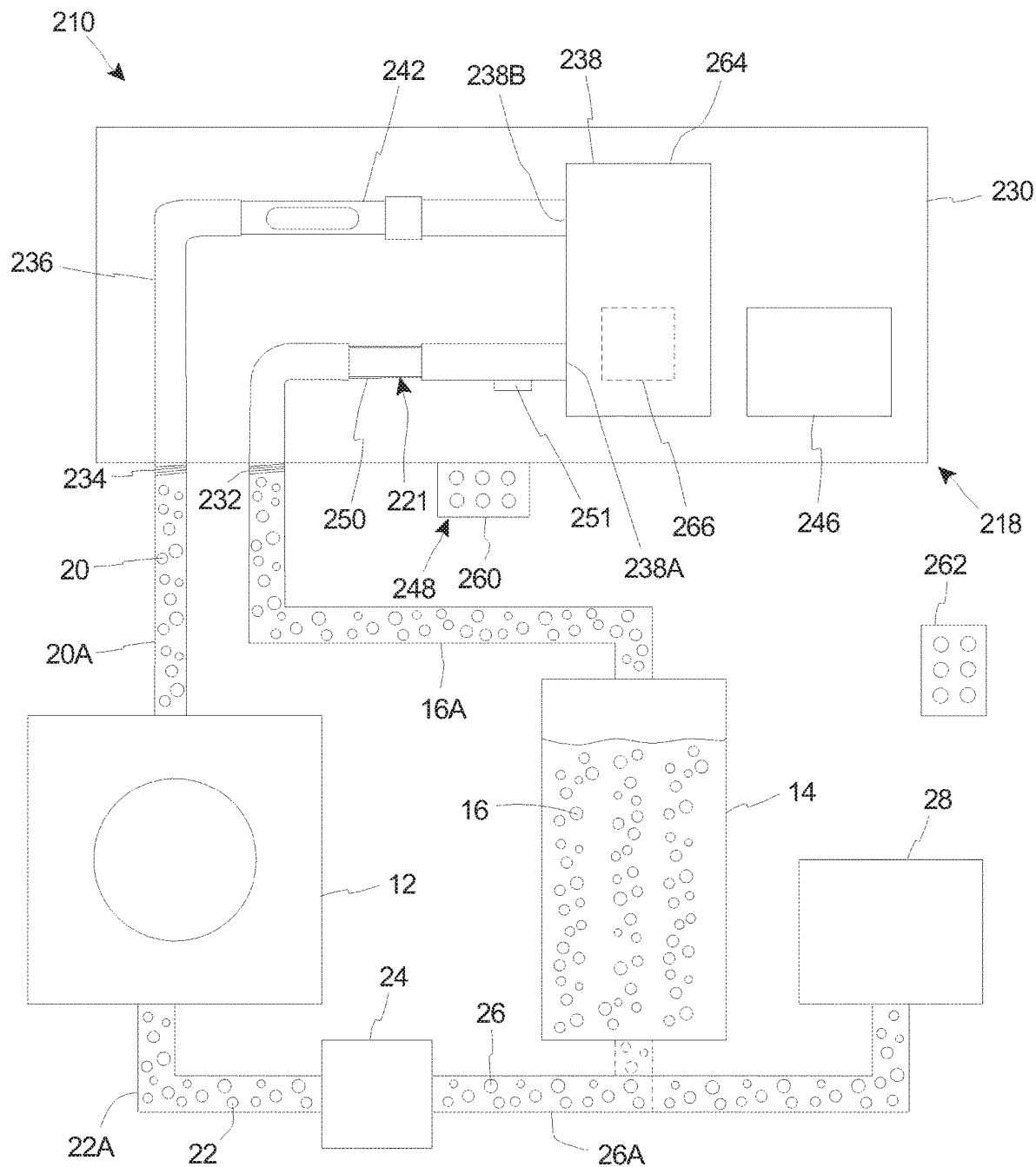
FIG. 2 is a simplified schematic illustration of another embodiment of the ozone laundry system.

FIG. 2 is a simplified schematic illustration of another embodiment of the ozone laundry system 210. As illustrated in FIG. 2, the components of the ozone laundry system 210 outside of the water ozonation system 218, e.g., the washing machine 12, the water source 14, the filtration system 24 and the disposal system 28, and the water flow outside of the water ozonation system 218, e.g., through the inlet conduit 16A, the outlet conduit 20A, the expended water conduit 22A, and the filtered water conduit 26A, can be substantially identical to what was illustrated and described in relation to FIG. 1. Accordingly, such components and water flow will not be described again in relation to FIG. 2.

However, as shown in FIG. 2, in this embodiment, the design of the water ozonation system 218 can be somewhat different than what was illustrated and described in relation to FIG. 1. For example, as illustrated in this embodiment, the water ozonation system 218 need not include the air temperature sensor 52, the air humidity sensor 54, the dehumidifier 44, the gas mover 40, the air pump 59 and/or the air path control system 41.

As with the previous embodiment, the water ozonation system 218 is configured to provide ozonated water 20 to the washing machine 12 that includes a target (or desired) concentration level of ozone within the ozonated water 20 so that the washing machine 12 can more effectively and efficiently clean the laundry within the washing machine 12. Additionally, the water ozonation system 218 and/or the ozone laundry system 210 can be controlled to selectively operate in multiple modes of operation, such as described in detail above, although it is appreciated that without the dehumidifier, the water ozonation system 218 and/or the ozone laundry system 210 would not operate in Dry Mode.

As shown in this embodiment, the water ozonation system 218 can include one or more of a system body 230 including a system inlet 232 and a system outlet 234, an internal water conduit 236, a sensor assembly 221, an ozone generator 238, a water mixer 242, a controller 246, and a user control system 248. Alternatively, the water ozonation system 218 can include more components or fewer components than those specifically listed herein and illustrated in FIG. 2. For example, in certain non-exclusive alternative embodiments, the water ozonation system 218 can be designed without the water mixer 242.

As above, the system body 230 can have any suitable design and be formed from any suitable materials. As shown in FIG. 2, the source water 16 is supplied to the water ozonation system 218 through the system inlet 232. More particularly, as illustrated, the inlet conduit 16A (i.e. the source water conduit) is coupled in fluid communication with the system inlet 232 so that the source water 16 can be effectively introduced into the water ozonation system 218 via the inlet conduit 16A and the system inlet 232. Additionally, the ozonated water 20 leaves the water ozonation system 218 through the system outlet 234. More particularly, as illustrated, the outlet conduit 20A (i.e. the ozonated water conduit) is coupled in fluid communication with the system outlet 234 so that the ozonated water 20 can be directed through the system outlet 234 and the outlet conduit 20A to the washing machine 12.

Further, as with the previous embodiment, the internal water conduit 236 guides the flow of the source water 16 and/or the ozonated water 20 through and/or adjacent to the system body 230 of the water ozonation system 218. More specifically, the source water 16 that is introduced into the water ozonation system 218, i.e. via the system inlet 232, is transmitted through and/or adjacent to the system body 230 within the internal water conduit 236 before being converted into ozonated water 20. The ozonated water 20 is then further transmitted within the internal water conduit 236 through and/or adjacent to the system body 230 toward the system outlet 234 through which the ozonated water 20 leaves the water ozonation system 218.

As provided herein, the water ozonation system 218 includes the sensor assembly 221 that is uniquely configured to sense various ambient environmental conditions so that the controller 246 is able to better control the desired ozone concentration within the ozonated water 20 to be used within the washing machine 12. In some embodiments, as illustrated in FIG. 2, the sensor assembly 221 can include one or more of a water flow pressure sensor 250, and a water temperature sensor 251. As above, the ambient sensors 250, 251 collect data that is used to regulate the variable output of the ozone generator 238, i.e. the sensed ambient data is used by the controller 246 to determine the desired output of the ozone generator 238 for introducing target or desired concentration levels of ozone within the ozonated water 20. Alternatively, the sensor assembly 21 can be configured to include more individual sensors or fewer individual sensors than what is specifically illustrated and described in relation to FIG. 2. For example, in one non-exclusive alternative embodiment, the sensor assembly 221 is designed without the water temperature sensor 251

The water flow pressure sensor 50 is configured to sense the flow rate and/or flow pressure of the incoming source water 16. More particularly, after entering the system body 230, the source water 16 is directed through and/or adjacent to the water flow pressure sensor 250, which collects data on the water flow rate and/or water flow pressure of the source water 16. The water flow pressure sensor 250 then sends an electronic data signal to the controller 246 based on the sensed water flow rate and/or water flow pressure. The electronic data signal from the water flow sensor 250 provides an initial indication to the controller 246 that operation of the ozone generator 238 is needed (unless the ozone laundry system 210 is being operated in the No Ozone Mode), thus triggering the water ozonation system 218 out of Stand-By Mode.

Additionally, the controller 246 then uses the electronic data signal from the water flow pressure sensor 250, and any other sensor data, to determine the amount of ozone that is needed to be generated by the ozone generator 238 so that a final target or desired dissolved ozone concentration level in the ozonated water 20 can be achieved. Stated in another manner, the controller 246 regulates the level of ozone that is generated by the ozone generator 238 based at least in part on the electronic data signal received from the water flow pressure sensor 250.

The water temperature sensor 251 is configured to sense a water temperature of the source water 16. More particularly, as shown, after being directed through and/or adjacent to the water flow pressure sensor 250, the source water 16 can be directed through and/or adjacent to the water temperature sensor 251, which collects data on the source water 16. The water temperature sensor 251 then sends an electronic data signal to the controller 246 based on the sensed water temperature. The controller 246 then uses the electronic data signal from the water temperature sensor 251, and any other sensor data, to determine the amount of ozone that is needed to be generated by the ozone generator 238 so that a final target or desired dissolved ozone concentration level in the ozonated water 20 can be achieved. Stated in another manner, the controller 246 regulates the level of ozone that is generated by the ozone generator 238 based at least in part on the electronic data signal received from the water temperature sensor 251.

After being directed through and/or adjacent to the water flow pressure sensor 250 and/or the water temperature sensor 251, the source water 16 is directed to the ozone generator 238.

As with the previous embodiment, the ozone generator 238 is configured to generate a desired amount of ozone that can be injected into the source water 16 so that the ozonated water 20 has a target or desired level of ozone concentration. However, the ozone generator 238 in this embodiment has a different design than the corona discharge-type ozone generator that was described above. In FIG. 2, the ozone generator 238 is an electrolytic cell-type ozone generator that includes a generator tank 264 for receiving, i.e. via generator inlet 238A, and retaining a volume of source water 16, and a electrolytic cell 266 (illustrated in phantom) that is positioned within the generator tank 264. During use of the ozone generator 238, the electrolytic cell 266 is configured to break down at least a portion of the source water 16 into its component parts, i.e. hydrogen and oxygen, and then convert at least a portion of the liberated oxygen into ozone, with the ozone then being directly dissolved into the source water 16 to provide the desired ozonated water 20.

Once the ozone has been dissolved into the source water 16 to provide the desired ozonated water 20, the ozonated water 20 is directed out of the ozone generator 238 via the generator outlet 238B. As shown, in some embodiments, the ozonated water 20 can then be directed toward and through the water mixer 242 to ensure that the ozone is dissolved as desired within the ozonated water 20. Alternatively, however, the water ozonation system 218 can be configured without the water mixer 242, with the ozone having been previously dissolved into the source water 16 within the ozone generator 238.

After the desired ozonated water 20 has been generated, e.g., within the ozone generator 238 and/or within the water mixer 242, the ozonated water 20 is directed through the internal water conduit 236 to the system outlet 234 where the ozonated water 20 leaves the system body 230.

As noted above, the controller 246 receives electronic data signals from the sensor assembly 221, i.e. the water flow pressure sensor 250 and/or the water temperature sensor 251, and then utilizes a specially designed algorithm to determine the desired and/or preferred ozone concentration level within the ozonated water 20 based at least in part on the electronic data signals from the sensor assembly 221. The controller 246 then sends voltage at an appropriate level to the electrolytic cell 266 to control operation of the electrolytic cell 266 so that a specific amount of ozone will be generated within the ozone generator 238 to be mixed into the source water 16 to provide the desired dissolved ozone concentration target level within the ozonated water 20.

Additionally, as with the previous embodiment, the user control system 248, i.e. the control panel 260 and/or the remote control 262, is utilized by the user to control the water ozonation system 218 to operate in certain desired modes of operation.

Figure 3:
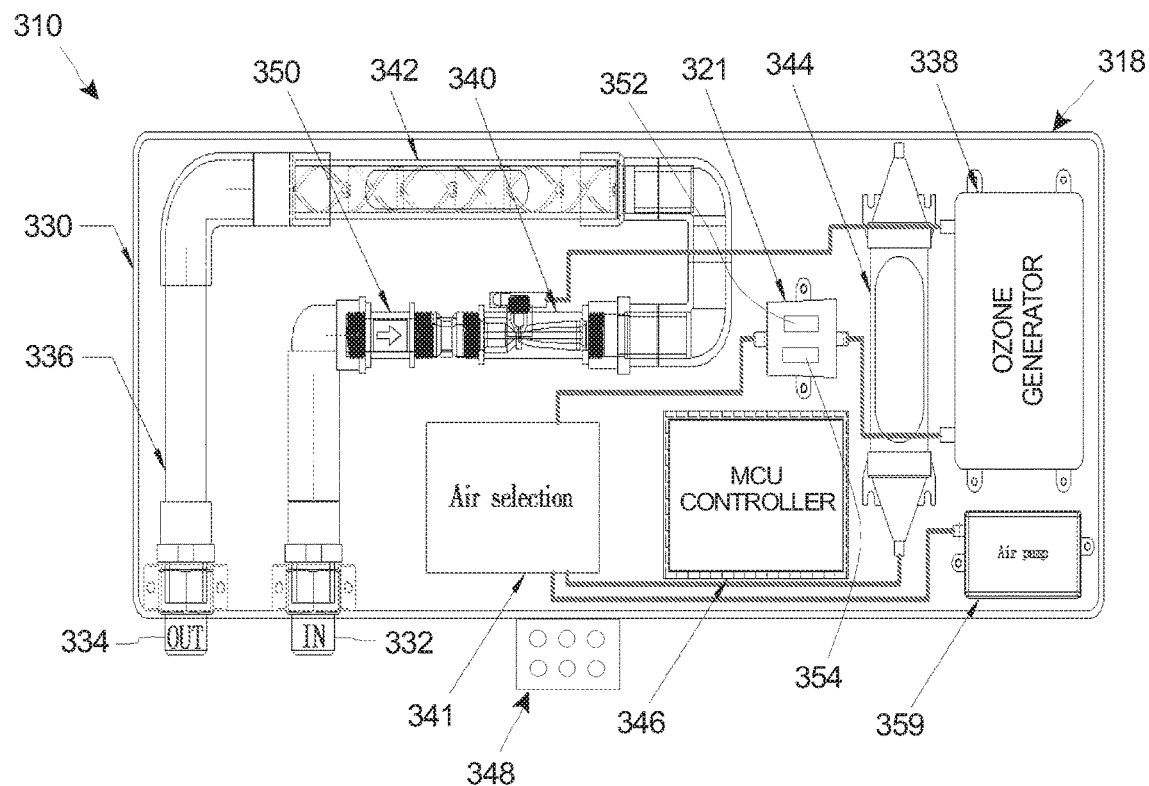
FIG. 3 is a simplified schematic illustration of a portion of still another embodiment of the ozone laundry system.

As provided herein, it is appreciated that certain features, components and/or modes of operation of the water ozonation system can be varied from what has been specifically illustrated and described in detail herein above. For example, FIG. 3 is a simplified schematic illustration of a portion of still another embodiment of the ozone laundry system 310 where the features, components and/or precise mode of operation of the water ozonation system 318 can vary somewhat from the previous embodiments. However, it is further appreciated that the water ozonation system 318 is still configured to introduce dissolved ozone into the incoming source water 16 (illustrated in FIG. 1) from the water source 14 (illustrated in FIG. 1) at selected concentration levels (or within approximate concentration ranges) to generate desired ozonated water 20 (illustrated in FIG. 1) before such ozonated water 20 is supplied to the washing machine 12 (illustrated in FIG. 1). More particularly, as above, the water ozonation system 318 is configured to provide ozonated water 20 to the washing machine 12 that includes a target (or desired) concentration level of ozone within the ozonated water 20 so that the washing machine 12 can more effectively and efficiently clean the laundry within the washing machine 12.

As illustrated in FIG. 3, the water ozonation system 318 is substantially similar to what has been illustrated and described herein above, although the precise fluid flow path and/or the precise air flow path may vary somewhat from the previous embodiments. In particular, as shown in FIG. 3, the water ozonation system 318 again includes a system body 330 having a system inlet 332 and a system outlet 334; an internal water conduit 336; a sensor assembly 321 including one or more of a water flow pressure sensor 350, an air temperature sensor 352 and an air humidity sensor 354; an ozone generator 338; a gas mover 340; an air path control system 341; a water mixer 342; a dehumidifier 344; a controller 346; an air pump 359; and a user control system 348 that are substantially similar in design and function to what has been illustrated and described herein above. However, it is appreciated that the air flow path is somewhat different than what has illustrated and described above. Additionally, it is recognized that the precise positioning of the components of the water ozonation system 318 can also be varied from what has been illustrated herein without deviating from the intended scope and breadth of the present invention.

Figure 4:
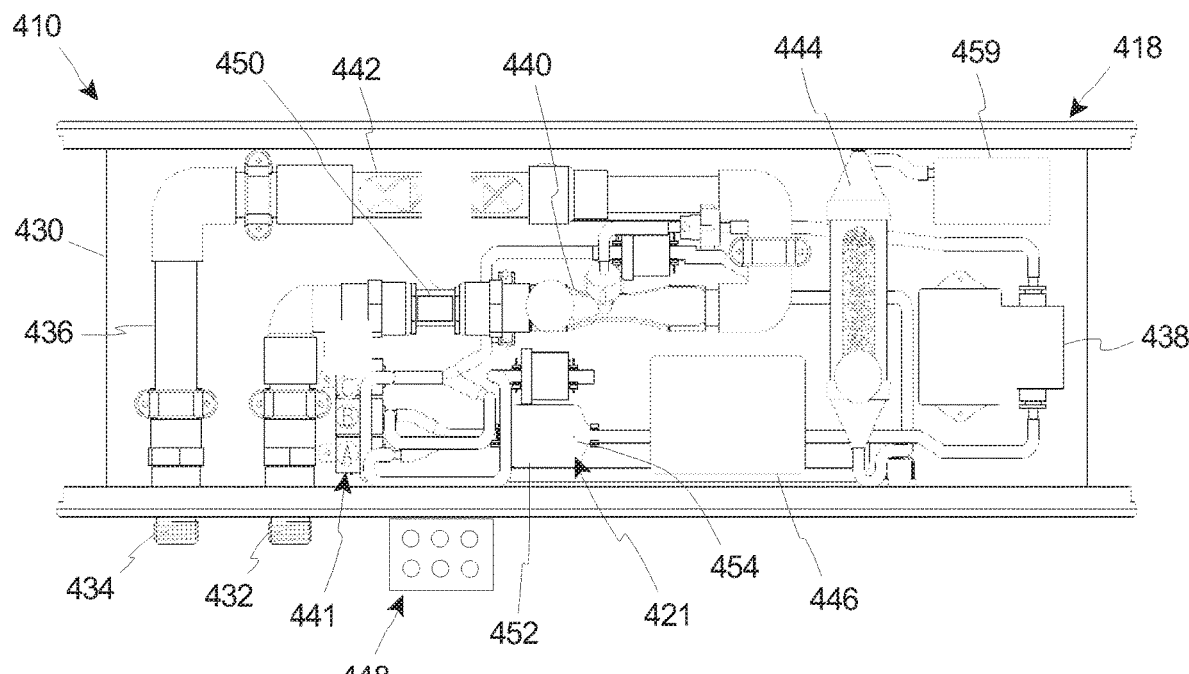
FIG. 4 is a simplified schematic illustration of a portion of yet another embodiment of the ozone laundry system.

Additionally, FIG. 4 is a simplified schematic illustration of a portion of yet another embodiment of the ozone laundry system 410 where the features, components and/or precise mode of operation of the water ozonation system 418 can vary somewhat from the previous embodiments. However, it is further appreciated that the water ozonation system 418 is still configured to introduce dissolved ozone into the incoming source water 16 (illustrated in FIG. 1) from the water source 14 (illustrated in FIG. 1) at selected concentration levels (or within approximate concentration ranges) to generate desired ozonated water 20 (illustrated in FIG. 1) before such ozonated water 20 is supplied to the washing machine 12 (illustrated in FIG. 1). More particularly, as above, the water ozonation system 418 is configured to provide ozonated water 20 to the washing machine 12 that includes a target (or desired) concentration level of ozone within the ozonated water 20 so that the washing machine 12 can more effectively and efficiently clean the laundry within the washing machine 12.

As illustrated in FIG. 4, the water ozonation system 418 is substantially similar to what has been illustrated and described herein above, although the precise fluid flow path and/or the precise air flow path may vary somewhat from the previous embodiments, and/or the precise design of and connections to each of the components of the water ozonation system 418 may vary somewhat from the previous embodiments. In particular, as shown in FIG. 4, the water ozonation system 418 again includes a system body 430 having a system inlet 432 and a system outlet 434; an internal water conduit 436; a sensor assembly 421 including one or more of a water flow pressure sensor 450, an air temperature sensor 452 and an air humidity sensor 454; an ozone generator 438; a gas mover 440; an air path control system 441; a water mixer 442; a dehumidifier 444; a controller 446; an air pump 459; and a user control system 448 that are substantially similar in design and function to what has been illustrated and described herein above. However, it is appreciated that the air flow path is somewhat different than what has illustrated and described above. Additionally, it is recognized that the precise positioning of the components of the water ozonation system 418 can also be varied from what has been illustrated herein without deviating from the intended scope and breadth of the present invention.

The use of the water ozonation systems 18 as described herein as part of the ozone laundry system 10 can provide various benefits for the user—health-related, economics-related, and environmental-related. More specifically, in various embodiments, the ozone laundry system 10 and/or the water ozonation system 18 of the present invention can provide advantages such as:

(1) utilizing a specially designed sensor assembly 21 including one or more of the air humidity sensor 54 that senses humidity in the ambient environment and the air temperature sensor 52 that senses air temperature in the ambient environment, with such data being sent to the controller 46, e.g., a printed circuit board assembly, to effectively control how much ozone to generate and/or the desired ozone concentration level that is desired for the ozonated water 20 according to the sensed ambient conditions;

(2) the sensor assembly 21 further including the water flow sensor that senses the ambient water flow pressure or water flow rate of the source water, which can be used to more precisely regulate the production of ozone in the ozone generator 38;

(3) the on-board dehumidifier 44 that removes humidity from the ambient air prior to the air being sent to the ozone generator 38, the on-board dehumidifier 44 including a self-regenerating desiccant pack that has a built-in heater and air dryer;

(4) the need for detergents, fabric softeners or chemical bleach when utilizing the ozonated water 20 is virtually eliminated;

(5) hot water is no longer needed in the laundry process;

(6) substantial cost savings are achieved by not needing to use hot water or chemical additives (one study conducted by the Department of Energy found that an average family of four can save over $650 by not needing to heat the water and by not needing to consume detergent, bleach and fabric softeners);

(7) clothes are better cleaned with an increased pathogen kill rate as compared to a normal laundry process using detergents and heated water;

(8) since no additives such as detergents, fabric softeners and/or bleaches are required, any chemicals from such additives, e.g., sodium lauryl sulfate (SLS), sodium laurite sulfate (SLES), nonylphenol ethoxylate (NPE), phosphates, etc., are not left behind in the clothes that are later absorbed into the body through skin. Thus, since such chemicals are known to be toxic, users are able to avoid potential hazards from such chemicals, such as cancer, birth defects, skin allergies, etc., which may otherwise be triggered by contamination caused from such chemicals;

(9) no chemical waste water pollution is generated due to no chemicals being used in laundry process;

(10) reduced wastewater pollution that contains harmful (poly) microfibers is generated as compared to using traditional laundering processes using standard laundry detergents and heated water;

(11) use of the ozonated water 20 within the washing machine 12 can remove mold, mildew and other biological debris that cause foul smells commonly found in front-load washing machines;

(12) reduced wear and long-term damage of fabrics caused from the laundry process, thus allowing clothes to come out softer and last longer, as compared to using traditional laundering processes using standard laundry detergents and heated water (ozone, being such a strong oxidant, can destroy germs, bacteria, mold, viruses and yeast far more effectively than using hot water and bleach, without damaging the clothes or polluting the environment); and

(13) the water ozonation system 18 for the ozone laundry system 10 is easy to install in a do-it-yourself manner, without the need for installation by a plumber or electrician under normal installation settings.

It is understood that although a number of different embodiments of the ozone laundry system 10 and/or the water ozonation system 18 have been illustrated and described herein, one or more features of any one embodiment can be combined with one or more features of one or more of the other embodiments, provided that such combination satisfies the intent of the present invention.

While a number of exemplary aspects and embodiments of an ozone laundry system 10 and/or a water ozonation system 18 have been discussed herein above, those of skill in the art will recognize certain modifications, permutations, additions and sub-combinations thereof. It is therefore intended that the present invention shall be interpreted to include all such modifications, permutations, additions and sub-combinations as are within their true spirit and scope, and no limitations are intended to the details of construction or design herein shown.

What is claimed is:

1. A water ozonation system that receives source water from a water source and converts it to ozonated water, the water ozonation system comprising:
   a system body that receives the source water from the water source;
   an ozone generator that is configured to generate ozone, the ozone generator being coupled to the system body;
   a sensor assembly that is coupled to the system body, the sensor assembly being configured to sense at least one ambient environmental condition and generate at least one electronic data signal based on the sensed at least one ambient environmental condition; and
   a controller that receives the at least one electronic data signal from the sensor assembly and regulates a level of ozone that is generated by the ozone generator based at least in part on the at least one electronic data signal;
   wherein the sensor assembly includes an air humidity sensor that senses an air humidity of ambient air at a point in time before any potential adjustment of the air humidity of the ambient air within the water ozonation system, and generates a first electronic data signal based on the sensed air humidity; and
   wherein the controller regulates the level of ozone that is generated by the ozone generator based at least in part on the first electronic data signal.

2. The water ozonation system of claim 1 further comprising a water mixer that receives the source water from the water source and the ozone from the ozone generator, the water mixer mixing the source water and the ozone to generate the ozonated water.

3. The water ozonation system of claim 1 wherein the sensor assembly further includes a water flow pressure sensor that senses a water flow pressure of the source water within the system body, and generates a second electronic data signal based on the sensed water flow pressure; and wherein the controller regulates the level of ozone that is generated by the ozone generator based at least in part on the first electronic data signal and the second electronic data signal.

4. The water ozonation system of claim 1 wherein the sensor assembly further includes a water temperature sensor that senses a water temperature of the source water, and generates a second electronic data signal based on the sensed water temperature; and wherein the controller regulates the level of ozone that is generated by the ozone generator based at least in part on the first electronic data signal and the second electronic data signal.

5. A water ozonation system that receives source water from a water source and converts it to ozonated water, the water ozonation system comprising:
   a system body that receives the source water from the water source;
   an ozone generator that is configured to generate ozone, the ozone generator being coupled to the system body;
   a sensor assembly that is coupled to the system body, the sensor assembly being configured to sense at least one ambient environmental condition and generate at least one electronic data signal based on the sensed at least one ambient environmental condition; and
   a controller that receives the at least one electronic data signal from the sensor assembly and regulates a level of ozone that is generated by the ozone generator based at least in part on the at least one electronic data signal;
   wherein the sensor assembly includes an air temperature sensor that senses an air temperature of ambient air at a point in time before any potential adjustment of the air temperature of the ambient air within the water ozonation system, and generates a first electronic data signal based on the sensed air temperature; and
   wherein the controller regulates the level of ozone that is generated by the ozone generator based at least in part on the first electronic data signal.

6. The water ozonation system of claim 5 wherein the sensor assembly further includes an air humidity sensor that senses an air humidity of the ambient air, and generates a second electronic data signal based on the sensed air humidity; and wherein the controller regulates the level of ozone that is generated by the ozone generator based at least in part on the first electronic data signal and the second electronic data signal.

7. The water ozonation system of claim 6 further comprising a dehumidifier that is configured to receive the ambient air and remove humidity from the ambient air prior to the ambient air being sent to the ozone generator.

8. The water ozonation system of claim 1 further comprising a dehumidifier that is configured to receive the ambient air and remove humidity from the ambient air prior to the ambient air being sent to the ozone generator.

9. The water ozonation system of claim 8 wherein the dehumidifier includes a drying tower that contains a desiccant that automatically absorbs surrounding humidity from the ambient air.

10. The water ozonation system of claim 9 wherein the dehumidifier further includes an electronic heater coil and an air pump that cooperate to selectively regenerate the desiccant.

11. The water ozonation system of claim 1 wherein the sensor assembly further includes a water temperature sensor that senses a water temperature of the source water, and generates a second electronic data signal based on the sensed water temperature; and wherein the controller regulates the level of ozone that is generated by the ozone generator based at least in part on the first electronic data signal and the second electronic data signal.

12. The water ozonation system of claim 1 wherein the ozone generator is a corona discharge-type ozone generator.

13. The water ozonation system of claim 1 wherein the ozone generator is an electrolytic cell-type ozone generator.

14. An ozone laundry system comprising a washing machine, and the water ozonation system of claim 1 that receives source water from a water source and converts it to ozonated water for use in the washing machine.

15. A method for converting source water to ozonated water, the method comprising the steps of:
   receiving the source water from a water source within a system body;
   coupling an ozone generator to the system body;
   coupling a sensor assembly to the system body, the sensor assembly being configured to sense at least one ambient environmental condition and generate at least one electronic data signal based on the sensed at least one ambient environmental condition;
   receiving the at least one electronic data signal from the sensor assembly with a controller; and
   generating ozone with the ozone generator, a level of the ozone that is generated by the ozone generator being regulated with the controller based at least in part on the at least one electronic data signal;
   wherein the step of coupling the sensor assembly includes sensing an air humidity of ambient air with an air humidity sensor at a point in time before any potential adjustment of the air humidity of the ambient air within the water ozonation system, and generating a first electronic data signal with the air humidity sensor based on the sensed air humidity; and
   wherein the step of generating ozone includes regulating the level of ozone that is generated by the ozone generator with the controller based at least in part on the first electronic data signal.

16. The method of claim 15 further comprising the steps of receiving the source water from the water source and the ozone from the ozone generator with a water mixer; and mixing the source water and the ozone with the water mixer to generate the ozonated water that is used in a washing machine.

17. The method of claim 15 wherein the step of coupling the sensor assembly further includes sensing a water flow pressure of the source water within the system body with a water flow pressure sensor, and generating a second electronic data signal with the water flow pressure sensor based on the sensed water flow pressure; and wherein the step of generating includes regulating the level of ozone that is generated by the ozone generator with the controller based at least in part on the first electronic data signal and the second electronic data signal.

18. The method of claim 15 wherein the step of coupling the sensor assembly further includes sensing a water temperature of the source water with a water temperature sensor, and generating a second electronic data signal with the water temperature sensor based on the sensed water temperature; and wherein the step of generating ozone includes regulating the level of ozone that is generated by the ozone generator with the controller based at least in part on the first electronic data signal and the second electronic data signal.

19. A method for converting source water to ozonated water, the method comprising the steps of:
receiving the source water from a water source within a system body;
coupling an ozone generator to the system body;
coupling a sensor assembly to the system body, the sensor assembly being configured to sense at least one ambient environmental condition and generate at least one electronic data signal based on the sensed at least one ambient environmental condition;
receiving the at least one electronic data signal from the sensor assembly with a controller; and
generating ozone with the ozone generator, a level of the ozone that is generated by the ozone generator being regulated with the controller based at least in part on the at least one electronic data signal;
wherein the step of coupling the sensor assembly includes sensing an air temperature of ambient air with an air temperature sensor at a point in time before any potential adjustment of the air temperature of the ambient air within the water ozonation system, and generating a first electronic data signal with the air temperature sensor based on the sensed air temperature; and
wherein the step of generating ozone includes regulating the level of ozone that is generated by the ozone generator with the controller based at least in part on the first electronic data signal.

20. The method of claim 19 wherein the step of coupling the sensor assembly further includes sensing an air humidity of the ambient air with an air humidity sensor, and generating a second electronic data signal with the air humidity sensor based on the sensed air humidity; and wherein the step of generating ozone includes regulating the level of ozone that is generated by the ozone generator with the controller based at least in part on the first electronic data signal and the second electronic data signal.

21. The method of claim 20 further comprising the steps of receiving the ambient air with a dehumidifier, and removing humidity from the ambient air with the dehumidifier prior to the ambient air being sent to the ozone generator.

22. The method of claim 15 further comprising the steps of receiving the ambient air with a dehumidifier, and removing humidity from the ambient air with the dehumidifier prior to the ambient air being sent to the ozone generator.

23. The method of claim 22 wherein the step of removing humidity includes the dehumidifier including a drying tower that contains a desiccant that automatically absorbs surrounding humidity from the ambient air.

24. The method of claim 23 wherein the step of removing humidity further includes the dehumidifier further including an electronic heater coil and an air pump that cooperate to selectively regenerate the desiccant.

25. The method of claim 15 wherein the step of coupling the sensor assembly further includes sensing a water temperature of the source water with a water temperature sensor, and generating a second electronic data signal with the water temperature sensor based on the sensed water temperature; and wherein the step of generating ozone includes regulating the level of ozone that is generated by the ozone generator with the controller based at least in part on the first electronic data signal and the second electronic data signal.

26. The method of claim 15 wherein the step of generating ozone includes the ozone generator being a corona discharge-type ozone generator.

27. The method of claim 15 wherein the step of generating ozone includes the ozone generator being an electrolytic cell-type ozone generator.

28. A method for using a washing machine including the steps of receiving water from a water source and converting it to ozonated water with the method of claim 26, and using the ozonated water in the washing machine.

29. A water ozonation system that receives source water from a water source and converts it to ozonated water, the water ozonation system being operable in at least a first mode and a second mode that is different than the first mode, the water ozonation system comprising:
a system body that receives the source water from the water source;
an ozone generator that is configured to generate ozone that is mixed with the source water to provide ozonated water, the ozone generator being coupled to the system body;
a sensor assembly that is coupled to the system body, the sensor assembly including an air humidity sensor that senses an air humidity of air that is directed toward the ozone generator, the sensor assembly generating a first electronic data signal based on the sensed air humidity; and
a controller that receives the first electronic data signal from the sensor assembly and regulates a variable level of ozone that is generated by the ozone generator based at least in part on the first electronic data signal and whether the water ozonation system is operating in the first mode or the second mode, the variable level of ozone that is generated by the ozone generator including (i) a first level of ozone that is mixed with the source water to provide the ozonated water having a first target ozone concentration level when the water ozonation system is operating in the first mode, and (ii) a second level of ozone that is different than the first level of ozone, the second level of ozone being mixed with the source water to provide the ozonated water having a second target ozone concentration level that is different than the first target ozone concentration level when the water ozonation system is operating in the second mode.

30. A method for converting source water to ozonated water within a water ozonation system that is operable in at least a first mode and a second mode that is different than the first mode, the method comprising the steps of:
receiving the source water from a water source within a system body;
coupling an ozone generator to the system body;
coupling a sensor assembly to the system body;
sensing an air humidity of air that is directed toward the ozone generator with an air humidity sensor of the sensor assembly;
generating a first electronic data signal with the sensor assembly based on the sensed air humidity;
receiving the first electronic data signal from the sensor assembly with a controller;
generating ozone with the ozone generator; and
regulating a variable level of the ozone that is generated by the ozone generator with the controller based at least in part on the first electronic data signal and whether the water ozonation system is operating in the first mode or the second mode, the variable level of ozone that is generated by the ozone generator including (i) a first level of ozone that is mixed with the source water to provide the ozonated water having a first target ozone concentration level when the water ozonation system is operating in the first mode, and (ii) a second level of ozone that is different than the first level of ozone, the second level of ozone being mixed with the source water to provide the ozonated water having a second target ozone concentration level that is different than the first target ozone concentration level when the water ozonation system is operating in the second mode.

31. The water ozonation system of claim 1 wherein the controller receives the first electronic data signal from the sensor assembly and regulates a variable level of ozone that is generated by the ozone generator based at least in part on the first electronic data signal, the variable level of ozone that is generated by the ozone generator including (i) a first level of ozone when the sensed air humidity is a first air humidity, the first level of ozone being mixed with the source water to provide the ozonated water having a first target ozone concentration level, and (ii) a second level of ozone that is different than the first level of ozone when the sensed air humidity is a second air humidity that is different than the first air humidity, the second level of ozone being mixed with the source water to provide the ozonated water having a second target ozone concentration level that is different than the first target ozone concentration level.

32. The method of claim 15 wherein the step of receiving the at least one electronic data signal includes receiving the first electronic data signal from the sensor assembly with the controller; and further including the step of regulating a variable level of ozone that is generated by the ozone generator with the controller based at least in part on the first electronic data signal, the variable level of ozone that is generated by the ozone generator including (i) a first level of ozone when the sensed air humidity is a first air humidity, the first level of ozone being mixed with the source water to provide the ozonated water having a first target ozone concentration level, and (ii) a second level of ozone that is different than the first level of ozone when the sensed air humidity is a second air humidity that is different than the first air humidity, the second level of ozone being mixed with the source water to provide the ozonated water having a second target ozone concentration level that is different than the first target ozone concentration level.

\* \* \* \* \*